United States Patent Office 2,855,366
Patented Oct. 7, 1958

2,855,366
SULFURIZED ADDITIVES FOR LUBRICANTS

Allan Manteuffel, Union, and William D. Gilson, Crystal Lake, Ill., assignors to The Pure Oil Company, Chicago, Ill., a corporation of Ohio No Drawing. Application August 31, 1953
Serial No. 377,730

4 Claims. (Cl. 252—78)

This invention relates to a sulfur-containing composition and is particularly concerned with beneficiating mineral oils by the addition of the sulfurized material thereto.

Although modern refining techniques will permit the production of improved mineral oil lubricants from crude oils, these lubricants are still deficient in certain important lubricating qualities. It is therefore essential in the formulation of lubricants to impart to mineral oil bases the characteristics which are inherently lacking. In order for lubricants to lubricate under extreme pressure conditions and to operate at moderate loads with low friction loss, it is necessary to incorporate into the lubricant a suitable additive or additives. Although these qualities may be given to a lubricant by the use of separate materials, multi-functional additives have been developed which are not only not effective in boundary lubrication but extreme pressure applications as well.

It is therefore an object of this invention to provide a chemical composition which can be employed to impart oiliness and extreme pressure characteristics to a mineral oil. Another object of this invention is to provide an extreme pressure additive having improved solubility and oiliness properties. It is also an object of this invention to provide a sulfurized material which may be used as an antisquawk additive in an automatic transmission fluid and to provide an acceptable automatic transmission fluid containing this anti-squawk additive. These and other objects and advantages will become apparent from the following detailed discussion of the invention.

Extreme pressure properties and/or oiliness are essential where mineral oil compositions are used in machining operations where metal parts are fabricated by milling, turning, drilling or shaping. Oiliness characteristics are important from a standpoint of tool wear and power consumption, while extreme pressure properties are important in preserving a proper cutting edge on the tool and obtaining a good product finish.

Similarly in automotive vehicles where power is transferred from the prime mover to the propelling means through appropriate power transmission devices, it is of prime importance to employ a lubricant having a high film strength to withstand the great pressures which are developed between the moving surfaces of the transmission components. These devices employ gear oils having extreme pressure and oiliness characteristics. These oils accordingly function as lubricants and also provide a moderate heat transfer effect by acting as a coolant.

With the advent of the automatic transmission as practically standard equipment on modern automotive vehicles, additional duties have been imposed on gear oils. In automatic transmissions the fluid element thereof not only functions as a gear oil but as a hydraulic fluid as well. Furthermore the more complicated mechanism is composed of elements that must cooperatively perform without chattering or squaking, a "slip-stick" phenomenon which is thought to be related to the oiliness of the fluid. To illustrate the high quality requirements, reference is made to Table I which summaries the requirements for an approved automatic transmission fluid.

TABLE I

Detailed requirements for passenger car automatic transmission fluid

| Test | Requirements |
|---|---|
| 1. Miscibility | Pass. |
| 2. Viscosity, Saybolt Universal, 210° F | 49 min. |
| Viscosity, Saybolt Universal, 210° F | (*) |
| 3. Viscosity, Saybolt Universal, 0° F | 7,000 max. |
| 4. Viscosity Index | (*) |
| 5. Flash Point | 320. |
| 6. Fire Point | 350. |
| 7. Pour Point | −35 max. |
| 8. Copper Strip Test | Pass. |
| 9. Anti-Foaming Properties | Pass. |
| 10. Heating Test | Pass. |
| 11. Non-Corrosion and Non-Rusting Properties | Pass. |
| 12. Effect on Seals | Pass. |
| 13. Odor | Pass. |
| 14. Non-Toxic Properties | Pass. |
| 15. Oxidation Test on Fluid as Marketed | Pass. |
| 16. Oxidation Test on Fluid Diluted With Equal Volume of Reference Oil | Pass. |
| 17. Non-Chatter or Squawking Properties | Pass. |
| 18. Durabiliy (Cycling) Test | Pass. |
| 19. Viscosity Stability, Change in Viscosity During Durability (Cycling) or Performance Test: | |
| Saybolt Universal, 210° F | 46.5 min. |
| Saybolt Universal, 0° F | 7,000 max. |
| 20. Frictional Properties | Pass. |
| 21. Performance in Transmissions Under Service Conditions | Pass. |
| 22. G. M. Low Temperature Fluidity Test (8 hrs. at −45° F.). | As good as or better fluidity than manufacturer supplied Reference Oil under the same test conditions. |
| 23. Cold Room Dynamometer Test | Pass. |

*To permit some freedom in choice of oil stocks no maximum viscosity at 210° F. or viscosity index is specified.

In addition to complying with the physical requirements set forth in the foregoing table, it is also necessary that an automatic transmission fluid be tested in actual performance test at the proving ground and passed upon in current production units before the fluid can be considered as acceptable. It should be emphasized that such rigorous requirements insure trouble-free operation. These standards were established from the characteristics of an acceptable fluid which was designed and developed along with the automatic transmission just as all other component parts were developed. Accordingly acceptable fluids are considered as an integral part of the transmission.

Sulfurized vegetable oils, animal fats and oils and marine fats and oils, as well as their synthetic counterparts, have long been used as lubricating oil additives and have been used with some degree of success in the foregoing applications. However these materials in general have high viscosity and limited solubility as well as being deficient in oiliness properties necessary for certain applications. It has been found however that the addition of high molecular weight fatty acids to the fat stocks prior to sulfurization enhances the oiliness, solubility and viscosity properties of the finished additive, permitting the formulation of improved cutting oils, gear oils and automatic transmission fluids.

Fatty oils which may be employed in carrying out the instant invention include non-drying, naturally occurring oils, such as tallow, lard oil, palm kernel oil, olive oil, herring and sardine oil. These materials are essentially mixtures of glycerides in which a substantial portion of the glycerides have unsaturated substituent groups.

Similarly naturally occurring waxes may be used. These waxes differ from the above mentioned fatty oils in that they are esters of high molecular weight monohydric alcohols. Examples of such waxes are degras, sperm oil, carbinol wax, lanolin, japan wax and the like. These compositions also contain materials which have mono-ethenoid linkages in the molecule. It is also contemplated that synthetic esters prepared by reacting a mono or polyhydric alcohol with a high molecular weight mono-ethenoid fatty acid, such as decenoic, myristoleic, palmitoleic, oleic, erucic and tetracosenoic, may be used in carrying out the instant invention. In order to facilitate a further discussion of the invention, the above materials will hereinafter be referred to as fatty esters. In carrying out the instant invention a minor amount of a fatty acid is added to the fatty ester. Examples of suitable acids which may be used in this invention include saturated fatty acids as well as unsaturated fatty acids such as oleic, myristoleic, stearic, palmitoleic, gadoleic, etc. However when the saturated acids are employed it is necessary to employ conditions for sulfurizing whereby the sulfur is introduced into the molecule by substitution rather than addition. In order to achieve the objects of the instant invention an amount in excess of about 4% by weight of fatty acid should be employed. The amount of fatty acid used may be varied according to the particular fatty esters being processed. Accordingly the optimum amount is best determined experimentally for each fatty ester employed by making tests on small amounts. In general, 8% may be used, although in some instances as little as 4% may be effective. On the other hand, quantities as high as 30% may be required in exceptional cases.

The compounded fatty ester and fatty acid are then sulfurized according to any of the conventional techniques.

Sulfur may be introduced into the composition by means of sulfur or a sulfur halide. By reacting the sulfurizing agent with the mixtures of fatty ester and fatty acid at an elevated temperature of about 358° to 370° F., a sulfurized additive is obtained. The amount of sulfurizing reagent employed will depend upon the desired sulfur content of the final product. While relatively high sulfur content in the molecule increases the efficiency of the additive, this advantage must be balanced against the high viscosity of the sulfurized product, processing difficulties, as well as other disadvantages. Therefore, depending upon the type of material being sulfurized and the end use of the product, sulfurizing agent in an amount sufficient to incorporate chemically about 8.5% to 10% in the mixture of fatty ester and fatty acid can be employed, although in certain mixtures amounts less than or greater than these proportions may be necessary. Suitable techniques for sulfurizing by this means may be found in United States Patents 2,179,060 to 2,179,066.

Other sulfurizing agents which may be employed include the various phosphorus sulfides, such as phosphorus penta sulfide, $P_2S_5$, and phosphorus sesquisulfide, $P_4S_3$. In carrying out the reaction with phosphorus sulfide the techniques described by Williams et al. in Reissue Patent 22,849 and Musselman in United States Patent 2,441,587 can be used. Although it will be noted that the phosphorus sulfide-treated esters are recognized by the prior art and commercially employed as motor oil additives to reduce oxidation and bearing corrosion, it has also been found that such materials also exhibit extreme pressure and oiliness properties and have no deleterious effect on rubberoid elements when heat stabilized and accordingly may be employed as a multifunctional additive in the formulation of automatic transmission fluids. This improvement is disclosed and claimed in United States patent application, Serial Number 203,806, filed December 30, 1950, and now abandoned.

A third technique for producing sulfurized materials in which the instant invention may be employed with advantage involves the sulfurization of fatty esters by heating the esters with elemental sulfur or sulfur halides to chemically combine sulfur therewith. This initial sulfurization step is carried out in a manner similar to that described above. The sulfurized ester is then heated with a small amount of a phosphorus sulfide, such as phosphorus sesquisulfide, to produce a complex phosphorized and sulfurized material which contains substantially all of the added phosphorus in the oil-soluble form. The preparation of these materials is described more fully in such United States patents as 2,211,231, 2,211,306, and others. These materials generally have high viscosity and limited solubility. However, by commingling sufficient amounts of a fatty acid with the fatty ester which is to be treated in accordance with this technique, the solubility and oiliness properties of the phosphorized and sulfurized esters will be enhanced.

The following discussion will illustrate and demonstrate the instant invention. Sulfurized sperm oil has been employed as an anti-squawk additive in automatic transmission fluids since the development of these compositions. However the effectiveness of this material has not been consistent. The high viscosity of the sulfurized product has a deleterious effect on the low temperature characteristics of the fluid and, in order to control the viscosity, extreme care must be employed in the processing. The inconsistent result was remedied by the addition of small amounts of highly polar materials, such as oleic acid which is a well known oiliness agent, to the sulfurized sperm oil. While an automatic transmission fluid containing this compounded anti-squawk additive was initially satisfactory, it developed that time had an adverse effect and the efficiency of the added polar agent was lost. It was assumed that the acid neutralized or esterified on standing. When however a sperm oil sulfurized in the presence of an added portion of a free fatty acid (as oleic) in an amount equivalent to about 8% by weight was employed, a suitable stabilized anti-squawk additive was prepared.

In preparing this sulfurized sperm oil composition, a sulfurized product was obtained from a mixture of 10 parts by weight of flowers of sulfur to 90 parts by weight of fatty acid-sperm oil mixture. The fatty acid-sperm oil blend was initially heated to a temperature of about 275° to 285° F. The sulfur was then added and the temperature raised to about 340° to 360° F. During the processing which continued for a minimum of eight hours, the mixture was constantly stirred. A standard one minute copper strip corrosion test, showing a dark peacock result, evidences the completion of the processing. In the event the copper strip is flaky at the end of eight hours, the processing should continue for twelve to fourteen hours. The Saybolt viscosity of the finished base was approximately 160 seconds at 210° F. For application in automatic transmission fluids a maximum of 180 seconds at 210° F. is recommended. The viscosities should be run every two hours to check the course of the reaction. Sulfur content of the finished base was 9.3%.

In employing this invention in the preparation of an anti-squawk additive for automatic transmission fluid application, the amounts of added sulfur and processing time are important as illustrated by Table II.

TABLE II

*Experimental anti-squawk additives*

| Sample | Composition | | Reaction | | Characteristics | | |
|---|---|---|---|---|---|---|---|
| | Main Components, Percent | Percent Sulfur Added | Time, Hours | Temperature, °F. | Percent Sulfur by Analysis | Viscosity at 210° F. | Anti-Squawk Value |
| 1 | High Acid Sperm Oil | 10 | 8 | 350 | 9.3 | 157.5 | Good. |
| 2 | do | 10 | 6 | 350 | 9.07 | 137.1 | Poor. |
| 3 | Sample 2 further processed | | 11 | 350 | 8.37 | 142.2 | Good. |
| 4 | High Acid Sperm Oil | 11 | 17 | 350 | 9.96 | 161.4 | Fair. |

It will be noted that in order to provide a suitable anti-squawk additive from a sulfurized sperm oil, that it is necessary to carry out the sulfurization process for a time in excess of about 8 hours and employ an amount of sulfur not in excess of about 10% by weight.

A sulfurized high acid sperm oil prepared in accordance with the above technique was employed in an automatic transmission fluid having the following formulation:

Composition: Percent by weight
Mineral oil base ———————————————— 82.25
Solvent extract obtained from solvent refining of lubricating oils ———————————— 4.5
V. I. improver [1] ———————————————— 5.0
Detergent-antioxidant [2] —————————— 4.5
Pour point depressant [3] —————————— 0.75
Sulfurized high acid sperm oil ——————— 3.0

[1] Polymeric ester of the acrylic acid series.
[2] An oil-soluble polyvalent metal salt of an alkylated hydroxy aryl sulfide admixed with selected alkaline earth metal sulfonates.
[3] Low molecular weight condensation product of a chlorinated paraffin wax and a phenol.

This material was then subjected to the rigorous screening and performance test alluded to above and was approved by the General Motors Company as an acceptable automatic transmission fluid-Type A. This is to be compared with a similar automatic transmission fluid formulation in which 4.5% by weight of a sperm oil having a high molecular weight fatty acid content of about 1% (as oleic) was sulfurized according to the prior art techniques and was substituted in the formulation. This composition, although acceptable in all other regards, was rejected and not approved because this material had a tendency to squawk. It is thus seen that the sulfurized sperm oil prepared in accordance with this invention made the difference between approval or disapproval by the General Motors Company and that this approval was obtained using lesser amounts of sulfurized sperm oil than the sulfurized sperm oil anti-squawk additive prepared according to prior art techniques. Certain features of the automatic transmission formulation described above are disclosed and claimed in copending patent application, Serial Number 319,416, filed December 7, 1952. This case discussed fully the beneficial effects that are to be obtained from the use of a combination of a solvent extract obtained from the solvent refining of mineral lubricating oils and polymeric acrylic esters in mineral oil base automatic transmission fluids. It has also been found that in automatic transmission fluid formulations requiring exceptional oiliness characteristics the anti-squawk additive prepared according to this invention may be improved by the addition of other supplemental oiliness agents such as aliphatic esters having the formula $R_1COOR_2$ where $R_1$ and $R_2$ are dissimilar hydrocarbon substituents, e. g., butyl stearate, propyl oleate, butyl oleate, etc., aliphatic amines, e. g., dodecyl amine, tetradecyl amine, octadecyl amine, etc., and other equivalents.

It is to be understood that the amount of free fatty acid added to the sperm oil in the above example is illustrative and non-limiting. As it has been pointed out above, the type of fatty ester being processed influences the minimum amount that must be used to enhance the properties of the sulfurized ester. It is evident that other modifications of the above example will be apparent to those skilled in the art and are accordingly within the scope of the invention as defined by the appended claims.

It is hypothesized that the beneficiating effect produced by the instant invention is due to the function of the fatty acid present which apparently blocks the polymerization reaction between the sulfurizing reagent and the fatty ester. Evidence of this polymerization inhibition is seen in the low viscosity of the finished product. Thus effects similar to that produced by this invention would not result if a fatty ester and a fatty acid were separately sulfurized and admixed subsequent to the sulfurization. However inasmuch as an understanding of the reaction mechanism is not necessary for an appreciation of the advantages brought about by the instant invention, this postulation is intended to have a non-limiting effect on the scope of the invention.

It is thus seen by employing a chemical composition, prepared in accordance with this invention, to complement a mineral oil base lubricant, it is possible to supply certain deficiencies which result from the use of prior art materials. This invention permits the improvement of solubility, oiliness and viscosity properties of prior art extreme pressure agents and also permits the preparation of a suitable anti-squawk agent for use in the formulation of automatic transmission fluids.

Accordingly we claim:

1. In the manufacture of a sulfur-containing sperm oil composition for use as an anti-squawk additive in a mineral oil automatic transmission fluid, said additive prepared by the reacton between sperm oil and a sulfulrizing agent selected from the group consisting of elemental sulfur and sulfur chloride, the improvement which comprises carrying out the reaction for not less than about eight hours at a temperature of 340°–370° F. by employing a reaction mixture consisting of sperm oil, an added amount of about 4–8 parts by weight of oleic acid per 100 parts by weight of said sperm oil, and a sulfurizing agent in a quantity not in excess of about 10% by weight, based on said reaction mixture, but sufficient to chemically incorporate 8.5–10% by weight of sulfur in the product of said reaction, said additive having a viscosity not in excess of about 180 S. U. S. @ 210° F.

2. The improvement in accordance with claim 1 in which the sulfurizing agent is elemental sulfur.

3. The manufacture of a sulfurized sperm oil composition for use as an anti-squawk agent in a mineral oil automatic transmission fluid which comprises reacting a mixture consisting of 10 parts by weight of elemental sulfur, 90 parts by weight of an admixture of sperm oil and 4–8% by weight of oleic acid, based on said sperm oil, at a temperature of 340°–360° F. for a time of not less than about 8 hours but sufficient to react substantially all of said sulfur, the viscosity of said additive not being in excess of about 180 S. U. S. @ 210° F.

4. The manufacture in accordance with claim 3 in which the admixture of sperm oil and oleic acid contains 8% oleic acid, based on said sperm oil.

References Cited in the file of this patent

UNITED STATES PATENTS

| | | |
|---|---|---|
| 2,162,398 | Haas | June 13, 1939 |
| 2,191,498 | Reiff | Feb. 27, 1940 |
| 2,361,522 | Zimmer | Oct. 31, 1944 |
| 2,379,241 | McNab | June 26, 1945 |
| 2,407,954 | Fenske | Sept. 17, 1946 |
| 2,417,283 | Zimmer et al. | Mar. 11, 1947 |
| 2,459,718 | Barnum et al. | Jan. 18, 1949 |

UNITED STATES PATENT OFFICE
CERTIFICATE OF CORRECTION

Patent No. 2,855,366                                    October 7, 1958

Allan Manteuffel et al.

It is hereby certified that error appears in the printed specification of the above numbered patent requiring correction and that the said Letters Patent should read as corrected below.

Column 1, line 31, strike out "not", second occurrence; column 2, line 5, for "squaking" read -- squawking --; line 8, for "summaries" read -- summarizes --; column 6, line 33, for "function" read -- functioning --.

Signed and sealed this 10th day of March 1959.

(SEAL)
Attest:

KARL H. AXLINE                                          ROBERT C. WATSON
Attesting Officer                                         Commissioner of Patents